United States Patent
Ding

(10) Patent No.: US 9,945,933 B2
(45) Date of Patent: Apr. 17, 2018

(54) APPARATUS AND METHOD FOR MITIGATING INTERFERENCE IN A FREQUENCY-MODULATED CONTINUOUS-WAVE (FMCW) AUTOMOTIVE RADAR SYSTEM

(71) Applicant: Autoliv ASP, Inc., Ogden, UT (US)

(72) Inventor: Xueru Ding, Newton, MA (US)

(73) Assignee: Autoliv ASP, Inc., Ogden, UT (US)

( * ) Notice: Subject to any disclaimer, the term of this patent is extended or adjusted under 35 U.S.C. 154(b) by 349 days.

(21) Appl. No.: 14/808,307

(22) Filed: Jul. 24, 2015

(65) Prior Publication Data

US 2017/0023662 A1    Jan. 26, 2017

(51) Int. Cl.
| | |
|---|---|
| *G01S 7/02* | (2006.01) |
| *G01S 7/35* | (2006.01) |
| *G01S 13/34* | (2006.01) |
| *G01S 13/93* | (2006.01) |
| *G01S 13/58* | (2006.01) |

(52) U.S. Cl.
CPC ............... *G01S 7/023* (2013.01); *G01S 7/35* (2013.01); *G01S 13/343* (2013.01); *G01S 13/345* (2013.01); *G01S 13/346* (2013.01); *G01S 13/931* (2013.01); *G01S 13/584* (2013.01)

(58) Field of Classification Search
CPC .................................................... G01S 13/346
USPC .......................................................... 342/13
See application file for complete search history.

(56) References Cited

U.S. PATENT DOCUMENTS 8,599,062 B2    12/2013  Szajnowski
2005/0179582 A1*  8/2005  Woodington ...... B60K 31/0008
                                                                    342/70

FOREIGN PATENT DOCUMENTS

EP    2307908    1/2012

OTHER PUBLICATIONS

Search Report and Written Opinion dated Oct. 19, 2016 in corresponding PCT Application No. PCT/US2016/042926, filed Jul. 19, 2016.

* cited by examiner

*Primary Examiner* — Tashiana R Adams
*Assistant Examiner* — Helena H Seraydaryan
(74) *Attorney, Agent, or Firm* — Burns & Levinson LLP; Steven M. Mills

(57) ABSTRACT

In a frequency-modulated continuous-wave radar processing system and method, a linear frequency ramp signal is defined. The linear ramp signal is divided into a plurality of time sections. The sections of the linear ramp signal are rearranged in time such that the plurality of sections define a transmit control signal different than the linear ramp signal. A radar transmission signal is generated having a frequency varying with time according to the transmit control signal, and the radar transmission signal is transmitted into the region of interest. An intermediate frequency (IF) signal is generated using the radar transmission signal and radar receive signals received from the region of interest, a frequency of the IF signal being a difference between the frequency of the radar transmission signal and a frequency of the radar receive signals. The IF signal is low-pass filtered. Radar processing is performed on the low-pass-filtered IF signal.

20 Claims, 12 Drawing Sheets

APPARATUS AND METHOD FOR MITIGATING INTERFERENCE IN A FREQUENCY-MODULATED CONTINUOUS-WAVE (FMCW) AUTOMOTIVE RADAR SYSTEM

BACKGROUND

1. Technical Field

The present disclosure is related to automotive radar systems and, in particular, to an apparatus and method for substantially reducing or eliminating interference in a frequency-modulated continuous-wave (FMCW) automotive radar system.

2. Discussion of Related Art

In automotive radar systems, multiple radar sensors can be mounted to the host vehicle. Each radar sensor includes a transmitter for transmitting radar signals into a region of interest adjacent to the vehicle and a receiver for receiving return radar signals from objects in the region of interest. Processing circuitry in each sensor processes the received return radar signals to detect objects and determine range, bearing and/or velocity of the objects.

Because automotive radar systems can typically include multiple sensors operating on the same host vehicle, sensors can interfere with each other. That is, radar return signals received by the receiver of a first sensor can be affected by the radar signals transmitted by another sensor on the same vehicle. Similarly, the radar return signals received by the receiver of each sensor on the vehicle can be affected by the radar signals transmitted by another sensor on another vehicle. The radar system performance is typically characterized based on the ability of the system to detect objects and correctly determine their range, bearing and Doppler velocity. The radar processing of the system with the effects of this interference can adversely affect the detection performance of each sensor and the radar system in which the sensors are operating.

SUMMARY

According to one aspect, a radar processing method in a frequency-modulated continuous-wave (FMCW) radar system is provided. According to the method, a linear ramp signal having a frequency which varies linearly with time is defined. A plurality of time sections of the linear ramp signal are defined, such that each time section has a time duration. In a first order in time, the plurality of sections is ordered consecutively in time to define the linear ramp signal. The sections of the linear ramp signal are rearranged in time such that the plurality of sections are in a second order in time different than the first order. In the second order, the plurality of sections define a transmit control signal different than the linear ramp signal, the transmit control signal having a frequency which varies piecewise-linearly with time. A radar transmission signal is generated such that a frequency of the radar transmission signal varying with time according to the transmit control signal, and the radar transmission signal is transmitted into the region of interest. Radar receive signals are received from the region of interest. An intermediate frequency (IF) signal is generated using the radar transmission signal and the radar receive signals, a frequency of the IF signal being a difference between the frequency of the radar transmission signal and a frequency of the radar receive signals. The IF signal is low-pass filtered to generate a low-pass-filtered IF signal. Radar processing is performed on the low-pass-filtered IF signal to perform radar detection in the region of interest.

In some exemplary embodiments of this aspect, the radar system is an automotive radar system.

In some exemplary embodiments of this aspect, the method further comprises digitizing the low-pass-filtered IF signal.

In some exemplary embodiments of this aspect, the method further comprises digitizing the IF signal before low-pass filtering the IF signal.

In some exemplary embodiments of this aspect, low-pass filtering the IF signal comprises digital filtering.

In some exemplary embodiments of this aspect, low-pass filtering the IF signal comprises analog filtering.

In some exemplary embodiments of this aspect, the plurality of sections comprise eight sections.

In some exemplary embodiments of this aspect, the method further comprises, in at least one of the sections, reversing a direction in which the frequency of the radar transmission signal varies with time.

In some exemplary embodiments of this aspect, the sections of the linear ramp signal are rearranged in a pseudo-random fashion.

In some exemplary embodiments of this aspect, the sections of the linear ramp signal are rearranged in a random fashion.

According to another aspect, a frequency-modulated continuous wave (FMCW) radar system is provided. A transmitter transmits a radar transmission signal into a region of interest, and a receiver receives radar receive signals from the region of interest. Signal processing circuitry: (a) defines a linear ramp signal having a frequency which varies linearly with time, (b) defines a plurality of time sections of the linear ramp signal, each time section having a time duration, in a first order in time, the plurality of sections being ordered consecutively in time to define the linear ramp signal, (c) rearranges the sections of the linear ramp signal in time such that the plurality of sections are in a second order in time different than the first order, in the second order, the plurality of sections defining a transmit control signal different than the linear ramp signal, the transmit control signal having a frequency which varies piecewise-linearly with time, (d) generates the radar transmission signal, a frequency of the radar transmission signal varying with time according to the transmit control signal, (e) generates an intermediate frequency signal using the radar transmission signal and the radar receive signals, a frequency of the IF signal being a difference between the frequency of the radar transmission signal and a frequency of the radar receive signals. A low-pass filter low-pass filters the IF signal to generate a low-pass-filtered IF signal. The signal processing circuitry performs radar processing on the low-pass-filtered IF signal to perform radar detection in the region of interest.

In some exemplary embodiments of this aspect, the radar system is an automotive radar system.

In some exemplary embodiments of this aspect, the radar system further comprises an analog-to-digital converter for digitizing the low-pass-filtered IF signal.

In some exemplary embodiments of this aspect, the radar system further comprises an analog-to-digital converter for digitizing the IF signal before it is low-pass-filtered.

In some exemplary embodiments of this aspect, the low-pass filter is a digital low-pass filter.

In some exemplary embodiments of this aspect, the low-pass filter is an analog low-pass filter.

In some exemplary embodiments of this aspect, the plurality of sections comprise eight sections.

In some exemplary embodiments of this aspect, the signal processing circuitry, in at least one of the sections, reverses a direction in which the frequency of the radar transmission signal varies with time.

In some exemplary embodiments of this aspect, the sections of the linear ramp signal are rearranged in a pseudorandom fashion.

In some exemplary embodiments of this aspect, the sections of the linear ramp signal are rearranged in a random fashion.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
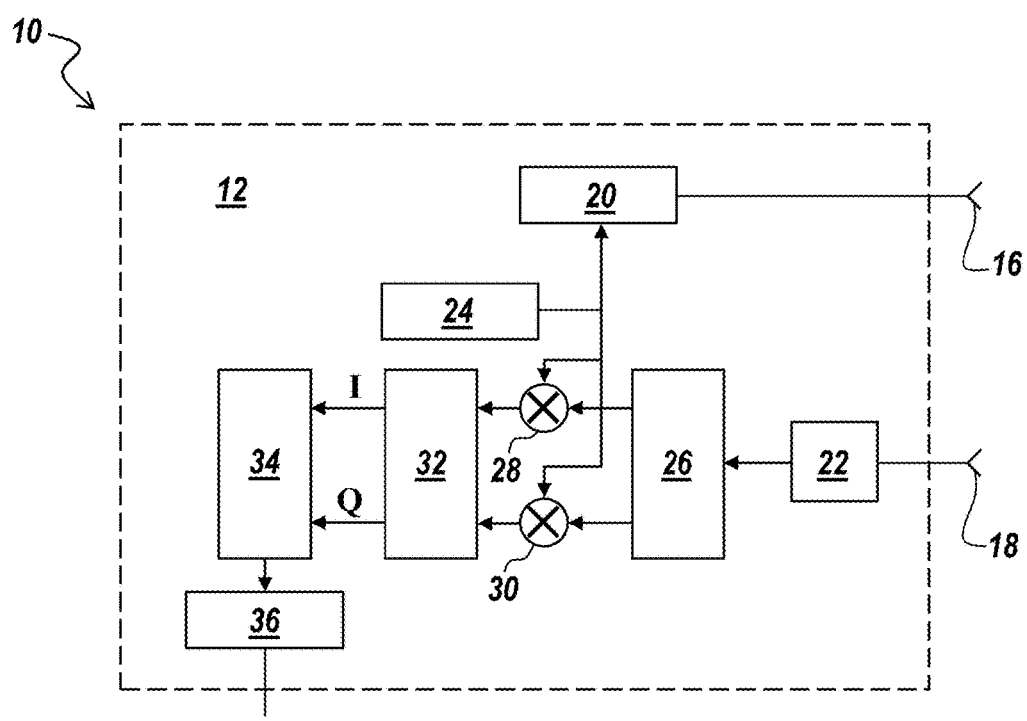
FIG. 1 includes a schematic block diagram of an automotive radar system, including one or more radar sensor modules for processing automotive radar signals, in accordance with exemplary embodiments.

According to the exemplary embodiments of the present disclosure, provided is an automotive radar system and automotive radar sensor and radar processing methods in which the undesirable effects of interference from other radar sensors are substantially reduced or eliminated. FIG. 1 includes a schematic block diagram of an automotive radar system 10, including one or more radar sensor modules 12 for processing automotive radar signals, in accordance with some exemplary embodiments. Referring to FIG. 1, radar system 10 includes one or more radar modules 12, which process radar transmit and receive signals which are compatible with radar system 10 in the host vehicle. Radar sensor module 12 generates and transmits radar signals into the region of interest adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as signal shaping/timing circuitry, transmit trigger circuitry, RF switch circuitry, RF power amplifier circuitry, or any other appropriate transmit circuitry used by radar system 10 to generate the transmitted radar signal according to exemplary embodiments described in detail herein.

Radar module 12 also receives returning radar signals at radar receive circuitry 22 via receive antenna 18. Radar receive circuitry 22 generally includes any circuitry required to process the signals received via receive antenna 18, such as RF low noise amplifier circuitry, signal shaping/timing circuitry, receive trigger circuitry, RF switch circuitry, or any other appropriate receive circuitry used by radar system 10. In some exemplary embodiments, the received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively, to generate I and Q intermediate frequency (IF) signals. The resulting IF signals are further filtered as required by filtering circuitry 32 to generate filtered IF I and Q signals, labeled "I" and "Q" in FIG. 1. The IF I and Q signals are digitized by analog-to-digital converter circuitry (ADC) 34. These digitized I and Q IF signals are processed by a processor, such as a digital signal processor (DSP) 36. In some exemplary embodiments, the DSP 36 can perform all of the processing required to carry out the object detection and parameter determination, including object range, bearing and/or velocity determinations, performed by system 10.

It will be understood that the system configuration illustrated in FIG. 1 is exemplary only and that other system configurations can be used to implement the embodiments described herein. For example, the ordering of filtering of the IF signal and analog-to-digital conversion may be different than the order illustrated in FIG. 1. The IF signal may be digitized before filtering, and then digital filtering may be carried out on the digitized signal(s).

Figure 2:
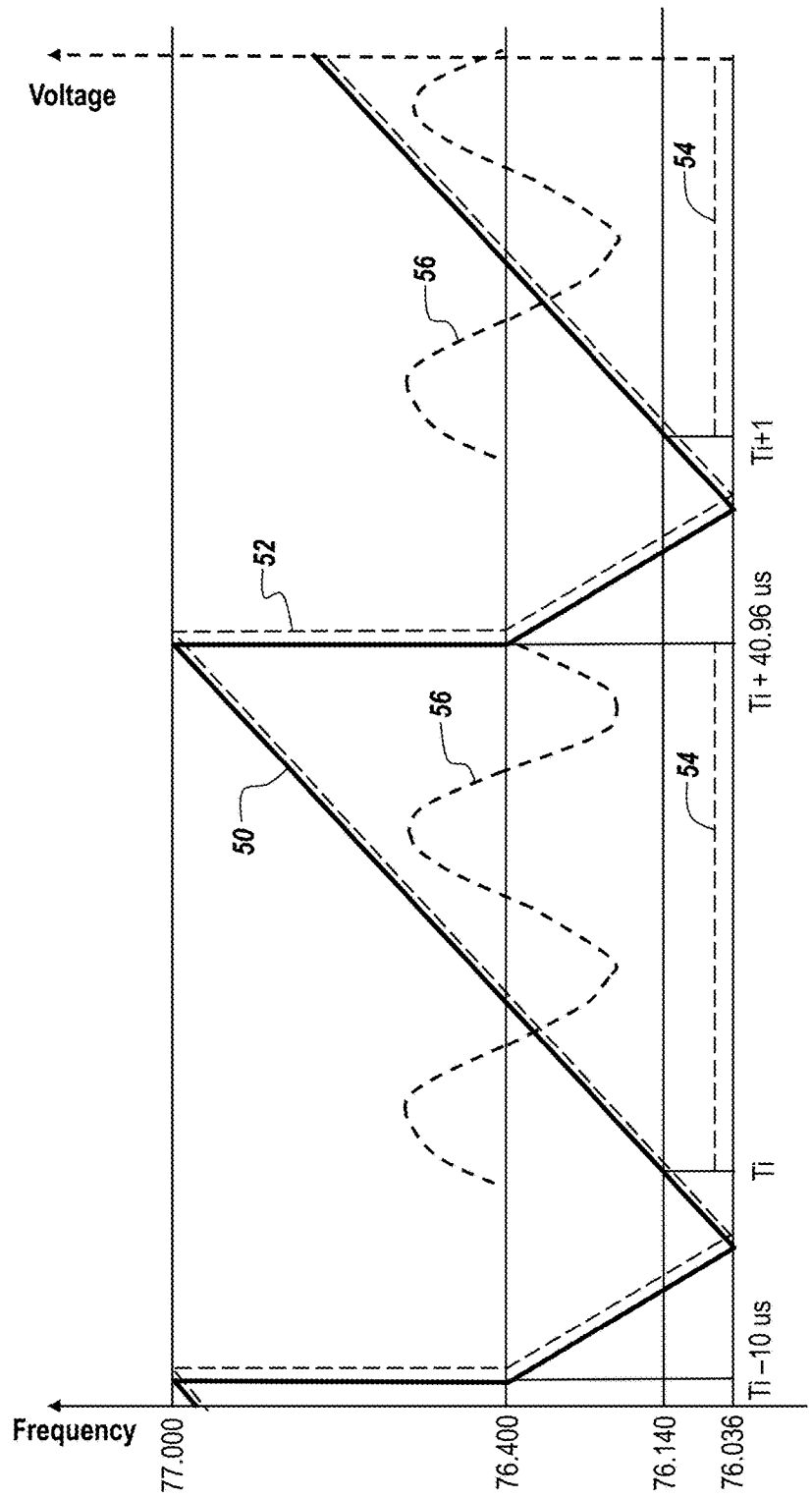
FIG. 2 includes a schematic timing diagram of signals in a conventional FMCW radar system.

According to the present disclosure, in a FMCW radar system, radar signals are transmitted into the region of interest in the form of continuous wave having a changing frequency. FIG. 2 includes a schematic timing diagram of signals in a conventional FMCW radar system. Referring to FIG. 2, transmitted radar signal 50, illustrated in a solid bold line, and the corresponding received radar signal 52, illustrated as a dashed bold line, are plotted as frequency vs. time. Curve 54 is a graph of the frequency of the IF signal, versus time. As shown in FIG. 2, the frequency of the IF signal $F_{IF}$ is the magnitude of the difference between the frequency of the transmitted signal $F_{TX}$ and the frequency of the received signal $F_{RX}$, i.e., $F_{IF}=|F_{TX}-F_{RX}|$. The IF output waveform is illustrated in curve 56 as voltage amplitude vs. time, superimposed in FIG. 2 over the frequency curves 50, 52, 54.

Referring to FIG. 2, in a conventional FMCW automotive radar system, radar signals are transmitted with a periodic linearly ramped frequency, as illustrated by curve 50. As a result, in the ideal case, a similarly linearly ramped return signal is received, shifted in time, as illustrated by curve 52. The frequency of the resulting IF signal is the difference between the frequencies of the two curves 50 and 52, which in the illustrated case is a constant. It is this IF waveform 56 that is processed to make radar detections and parameter determinations for objects in the region of interest.

In the particular exemplary waveforms illustrated in FIG. 2 and used throughout the present disclosure, the time of each linear frequency ramp is identified as $T_i$, where i is the index or number of the particular ramp. In the particular illustrations herein, the period of each cycle is approximately 50.96 μsec. The frequency in each cycle ramps linearly from approximately 76.036 GHz to approximately 77.000 GHz and then decreases rapidly through approximately 76.400 GHz and then slightly less rapidly back to the starting frequency of the next cycle at 76.036 GHz. The start of a first linear frequency ramp is illustrated to being at time $T_i$, and the start of the next cycle is illustrated to begin at time $T_{i+1}$. It will be understood that these particular parameters of the frequency ramp described herein are exemplary only. The present disclosure is applicable to any sets of parameters of the frequency ramps.

As indicated above, the timing diagram of FIG. 2 illustrates the ideal case in which the received return signal 52 is due entirely to reflections of the transmitted signal 50 from objects in the region of interest. In this case, processing of the resulting IF signal 56 results in accurate object detection and parameter determination. However, in actuality, the actual received signal may be influenced by other effects, which include interference caused by reflections of radar signals transmitted by transmitters of other radar sensors, either within or external to the same radar system. As a result, the IF signal processed to make object detections and parameter determinations includes extraneous information, which results in decreased system performance.

According to exemplary embodiments, the interference from other radar sensors is substantially reduced or eliminated by altering the transmit waveform such that it does not closely resemble the transmit waveform of other radar sensors and by the low-pass-filtering. As a result, in the received signal, the effects due to returns from the relevant transmit signal, i.e., the transmit signal generated by the sensor in which the processing is being carried out, can be distinguished from the IF-frequency differences due to returns from the transmit signals of other sensors for which IF-signal is normally generated at higher frequency, such that they can be readily filtered out from the processing, thus substantially reducing or eliminating the interference from the other sensors. Specifically, according to the exemplary embodiments, it is recognized that the returns from reflections of the transmit signal of interest will result in relatively lower IF frequency $F_{IF}=|F_{TX}-F_{RX}|$, since the difference in frequency between the received signal frequency and the corresponding transmit frequency is smaller. Furthermore, the IF frequency will also be relatively small in the case in which the transmit signal of the processing sensor closely tracks the transmit signal of an interfering sensor, such as where multiple sensors are deployed in a single radar system.

According to the present disclosure, in some exemplary embodiments, the transmit signal is generated such that it does not track the transmit signal of an interfering sensor. As a result, the IF signal will include signals having multiple frequency components. The IF receive signal will more closely track the associated transmit signal than it will any interfering transmit signals. Thus, in the IF signal, relatively low frequency components are due to reflections of the relevant associated transmit signals, while relatively high frequency components are due to transmit signals generated by an interfering transmitter. Thus, according to the exemplary embodiments, with the modified transmit signal, the receive signal that is relevant and desirable for the radar processing is distinguishable from the undesirable receive signal that is caused by interference based on the frequency components of the IF signal.

Figure 3:
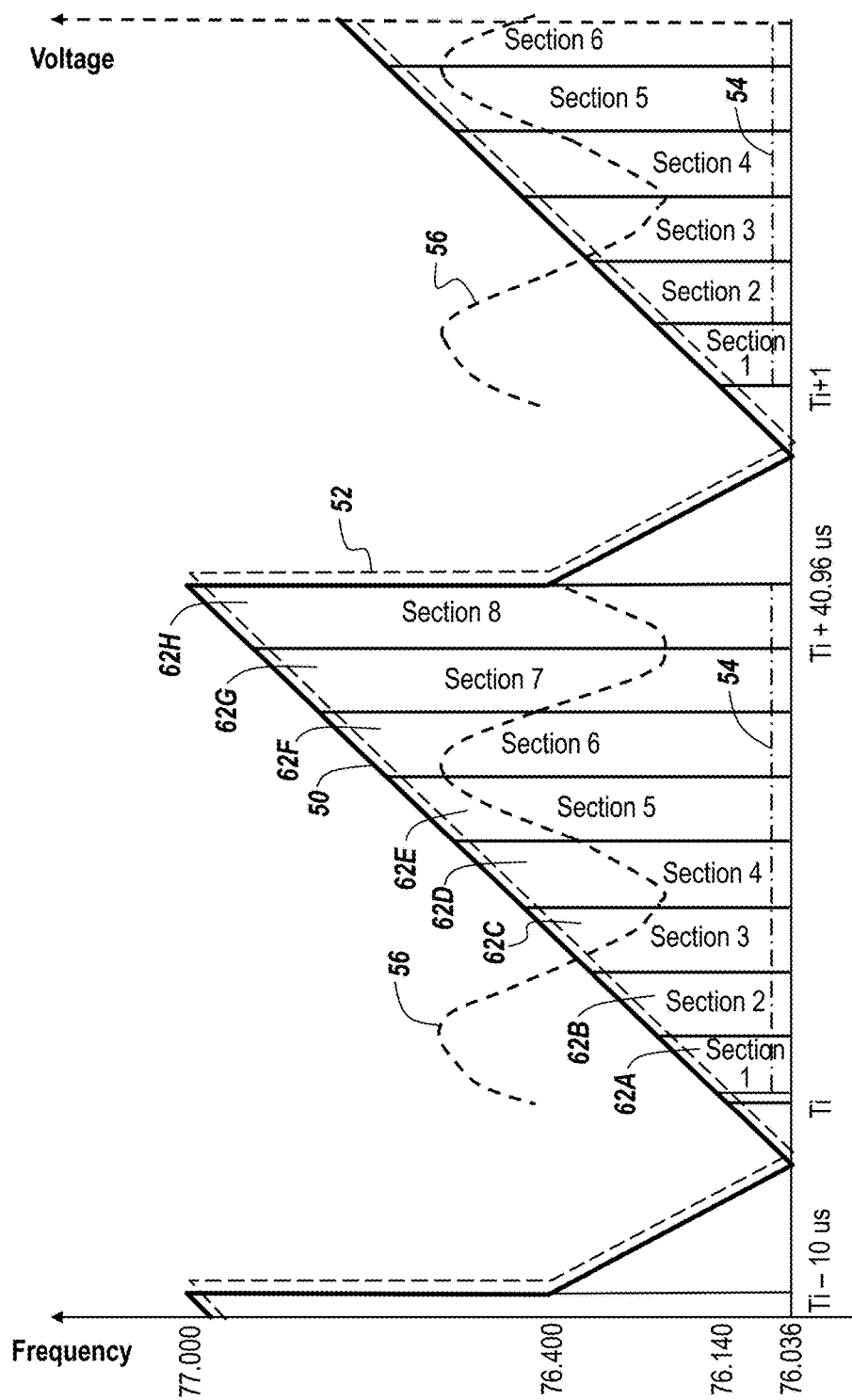
FIG. 3 includes a schematic timing diagram illustrating signals in an approach to defining a radar transmit signal as including multiple sections, according to exemplary embodiments.

FIG. 3 includes a schematic timing diagram illustrating signals in an approach to defining a radar transmit signal as including multiple sections, according to exemplary embodiments. Referring to FIG. 3, each ramp is divided into a plurality of sections or wedges 62A through 62H, also referred to as Sections 1 through 8. According to the exemplary embodiments, each section or wedge 62 is defined to include an associated section of transmitted signal 50, an associated section of received return signal 52 and an associated section of IF signal 56. According to exemplary embodiments, as illustrated in FIG. 3, each ramping cycle is sectioned or chopped into a quantity N wedges or sections 62. In the particular exemplary embodiment illustrated in FIG. 3, N=8. Hence, using the exemplary frequency range of FIG. 3, each section or wedge 62 defines an approximate frequency ramp range of 850 MHz÷8=106.25 MHz for an approximate time duration of 40.96 μsec÷8=5.12 μsec. With a particular exemplary sampling of 1024 points for a total sweep, each section or wedge 62 includes 1024÷8=64 sample points.

Figure 4:
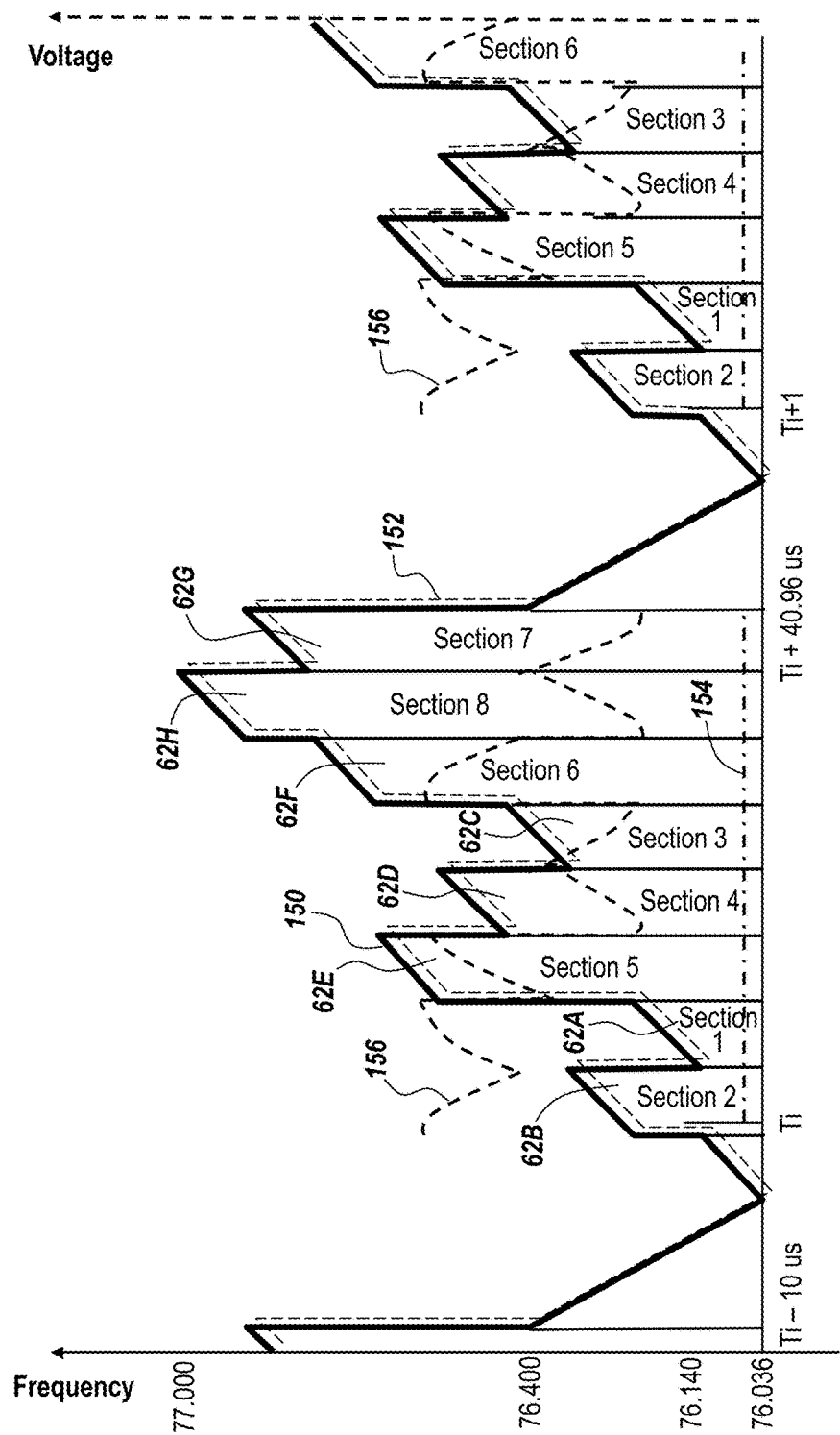
FIG. 4 includes a schematic timing diagram illustrating a rearranged or shuffled radar transmit signal and the resulting rearranged or shuffled receive signal and IF signal, according to exemplary embodiments.

According to exemplary embodiments, as described above, the transmitted signal is generated such that it does not track the transmitted signal of an interfering sensor. In some exemplary embodiments, this is accomplished by rearranging, i.e., "shuffling," the order of wedges or sections 62A through 62H in the transmitted signal. FIG. 4 includes a schematic timing diagram illustrating a rearranged or shuffled radar transmit signal 150 and the resulting rearranged or shuffled receive signal 152 and IF signal 156, according to exemplary embodiments. The rearrangement or shuffling of wedges 62 illustrated in FIG. 4 is one particular exemplary rearrangement. As illustrated, a random or pseudo-random process of rearranging sections 62 is used. In particular, it is noted that, in this particular shuffling, section 4 (62D) and section 6 (62F) have not been moved in time. It will be understood that other shuffling or rearrangement schemes can be used.

Referring to FIG. 4, the ideal case is illustrated. That is, the timing diagram of FIG. 4 illustrates the receive signal 152 due only to reflections of the transmitted signal 150 from objects in the region of interest. That is, the receive signal 152 illustrated in FIG. 4 is not affected by returns caused by the transmitted signal of an interfering sensor. Accordingly, the frequency of IF signal, i.e., the magnitude of the difference in frequency between the transmitted signal and the received signal, $F_{IF}=|F_{TX}-F_{RX}|$, is a constant, relatively small frequency difference, as illustrated by curve 154.

Figure 5:
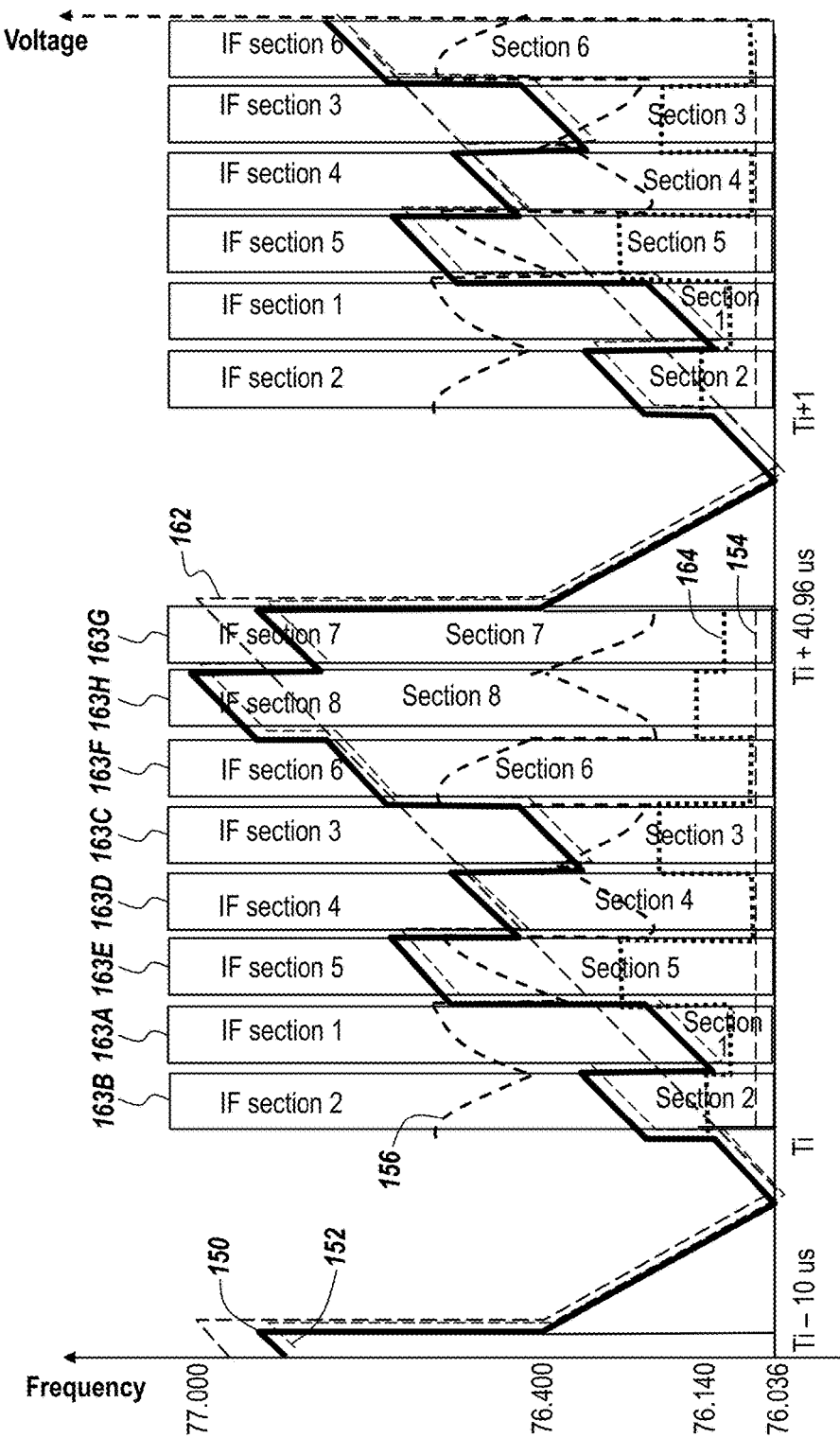
FIG. 5 includes a schematic timing diagram which is a modified version of the timing diagram of FIG. 4, modified to illustrate the effects of a transmitted signal from an interfering radar sensor, according to exemplary embodiments.

FIG. 5 includes a schematic timing diagram which is a modified version of the timing diagram of FIG. 4, modified to illustrate the effects of a transmitted signal from an interfering radar sensor, according to exemplary embodiments. Referring to FIG. 5, the timing diagram illustrates two additional curves compared to that of FIG. 4. Specifically, FIG. 5 includes curve 162, which illustrates the received signal due to the transmitted signal from an interfering sensor. Also, curve 164 illustrates the frequency of the IF signal, $F_{IF}=|F_{TX}-F_{RX}|$, including the effects of the interfering sensor and the effects of shuffling the wedges 62 of transmitted signal 150. As shown in FIG. 5, curve 162 illustrates the received frequency-ramped signal resulting from the frequency-ramped transmitted signal from the interfering sensor. As illustrated by curve 164, this interfering signal and the shuffling of wedges 62 of transmitted signal 150 cause changes in the resulting IF signal, in particular, in the frequency of the IF signal $F_{IF}$. In accordance with exemplary embodiments, the IF signal is low-pass filtered to remove the higher-frequency components of the IF signal, which are due primarily to the interfering sensor, leaving only the low-frequency components, which are due primarily to the transmitted signal of the present sensor. In some particular exemplary embodiments, the low-pass filter cut-off can be made to be approximately 30 MHz. This exemplary selection is based on the IF frequency of approximately 27.69 MHz of a target at 400 meters distance, at the exemplary operational radar frequencies. The resulting IF signal can be processed according to the wedges or sections in corresponding IF signal sampling timing windows 163A through 163H.

Figure 6:
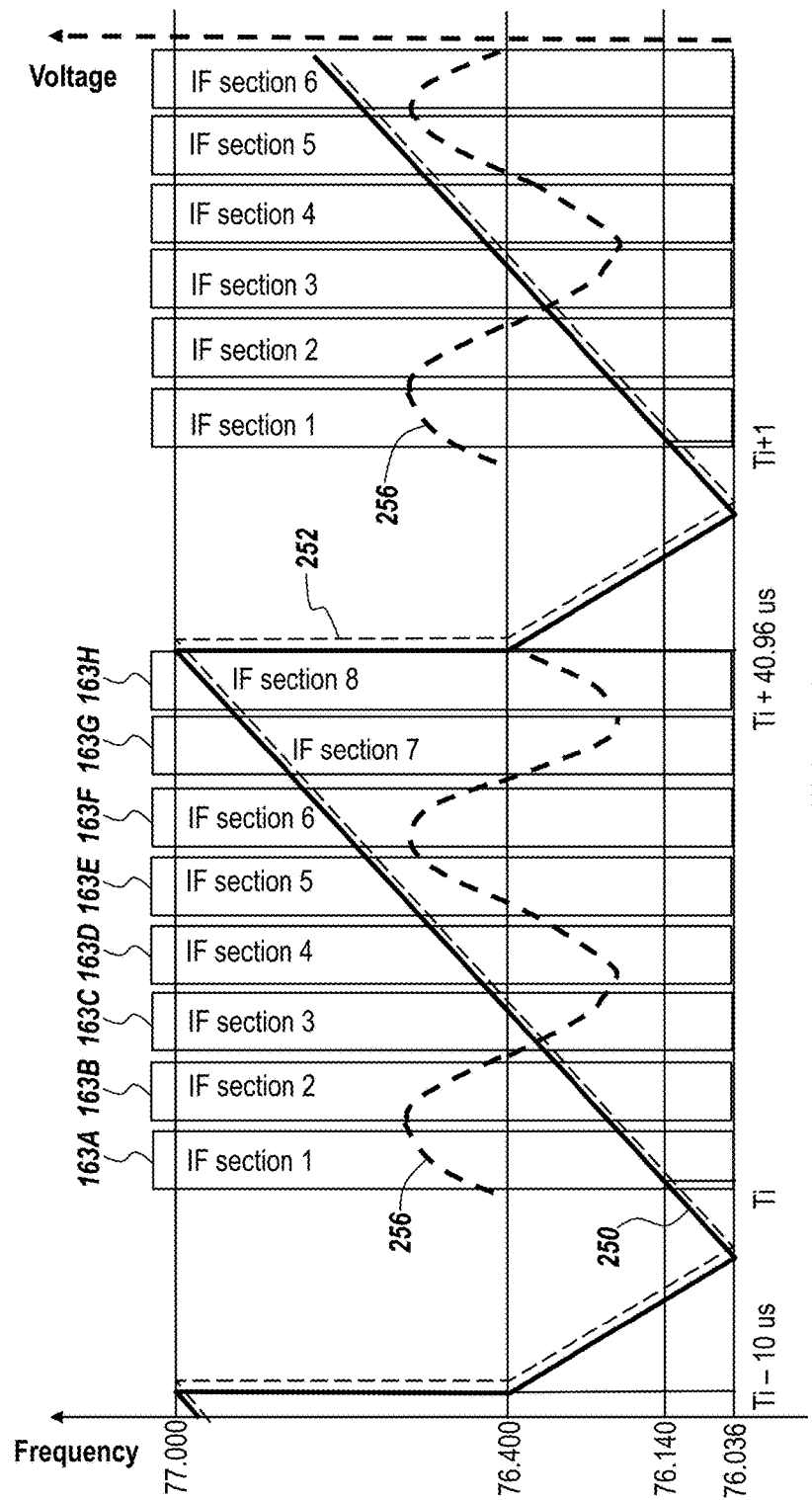
FIG. 6 includes a schematic timing diagram illustrating signals associated with the processing of the post low-pass-filtered IF digital signal recovery from the resulting rearranged or shuffled receive signal and IF signal shown in FIG. 5, according to some exemplary embodiments.

According to some exemplary embodiments, after the IF signal is low-pass filtered, the remaining IF signal, with only the low-frequency components due to the transmitted signal 150 of the present sensor of interest, with the high-frequency components due to the transmitted signal of the interfering sensor removed, is processed. FIG. 6 includes a schematic timing diagram illustrating signals associated with the processing of the low-pass-filtered IF signal, according to some exemplary embodiments. Referring to FIG. 6, the sections or wedges 62A through 62H, which correspond to IF signal sampling windows 163A through 163H, respectively, also referred to as IF sections 1 through 8, respectively, are reordered in time, and their data are "stitched" together, such that a time-uniform IF signal 256 is generated. Similarly, with the reordering and data stitching, associated frequency-ramp transmit signals 250 and frequency-ramp receive signals 252 are identified. The resulting IF signal 256 is processed to perform radar object detection and parameter determination, as illustrated and described above in connection with FIG. 1.

Figure 7:
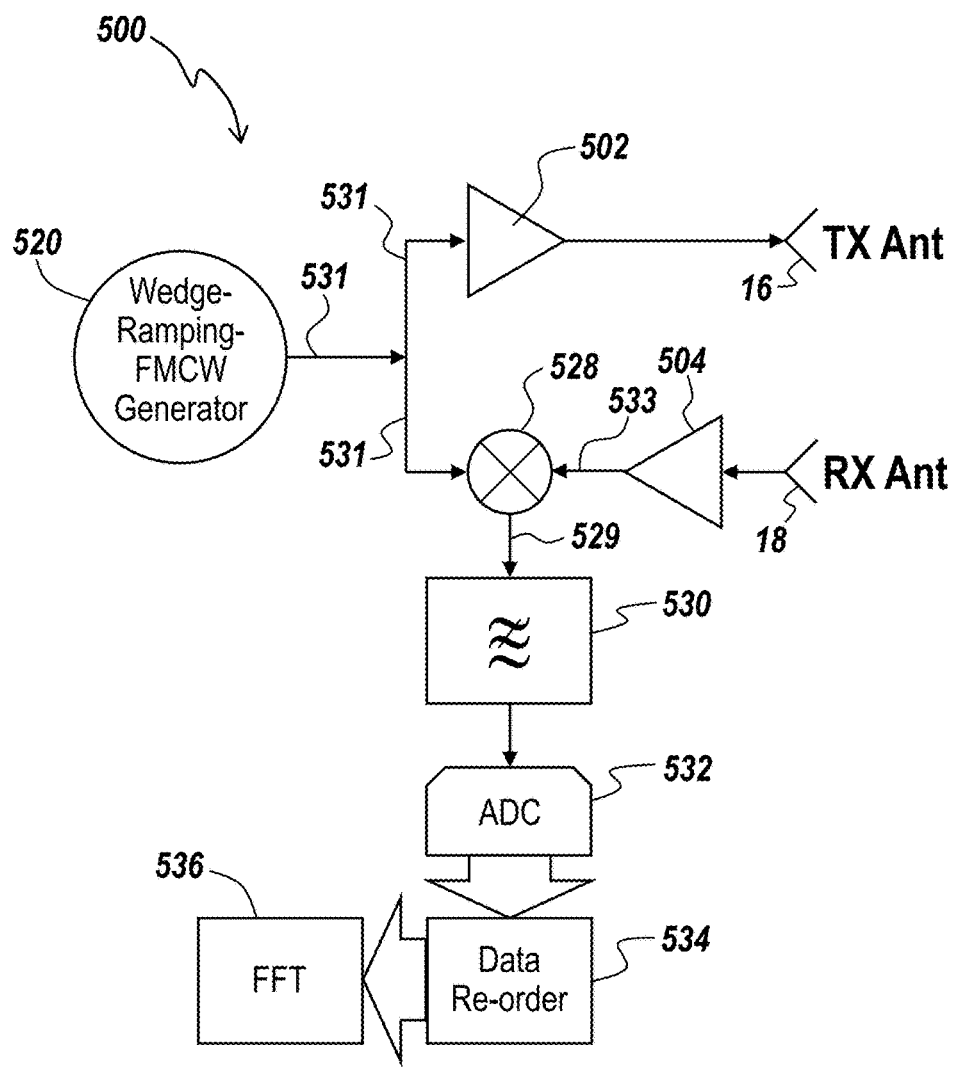
FIG. 7 includes a schematic functional block diagram which illustrates a radar sensor module for processing automotive radar signals, in accordance with exemplary embodiments.

FIG. 7 includes a schematic functional block diagram which illustrates a radar sensor module for processing automotive radar signals, in accordance with some exemplary embodiments. Referring to FIG. 7, the functional block diagram is a variation of the illustration of FIG. 1 to illustrate specific features applicable to the present exemplary embodiments. The functional block diagram of FIG. 7 is compatible with that of FIG. 1, and both diagrams are applicable to the exemplary embodiments described in detail herein.

Referring to FIG. 7, radar sensor module 500 includes a wedge-ramping FMCW generator 520, which generates the transmitted radar signal described herein in detail. For example, wedge-ramping FMCW generator 520 generates all of the transmitted radar signals, divided into multiple sections or wedges, as described above in detail and described below in detail in connection with the exemplary embodiments. The signal generated by generator 520, having a frequency referred to herein as $F_{TX}$, is transmitted on lines 531. The signal is amplified by amplification circuitry 502, and the amplified signal is transmitted into the region of interest via transmit antenna 16.

Radar signals are received by radar sensor module 500 at receive antenna 18 and are amplified by amplification circuitry 504. The amplified received signal, having a frequency referred to herein as $F_{RX}$, is transmitted on line 533 to a first input of a mixer 528. The signal from generator 520 is transmitted on lines 531 to a second input of mixer 528. The two signals are mixed in mixer 528, and an IF signal generated as the difference of the signals applied at the first and second inputs of mixer 528 is output on line 529. As described above in detail, the frequency of the IF signal is nominally defined as $F_{IF}=|F_{TX}-F_{RX}|$.

As described above in detail, the IF signal is low-pass filtered in low-pass filter 530 to remove the higher-frequency components of the IF signal due to the effects of an interfering sensor. The filtered signal is digitized by ADC 532. The digitized data for the multiple wedges or sections are then reordered and stitched together in processor 534. Normal radar processing on the reordered and stitched data is then performed, such as by DSP 36 illustrated in FIG. 1, which can include, for example, Fast Fourier Transform (FFT) processing 536. The normal radar processing results in object detection and parameter determination with the influence of an interfering radar sensor removed or substantially reduced, according to the exemplary embodiments.

Figure 8:
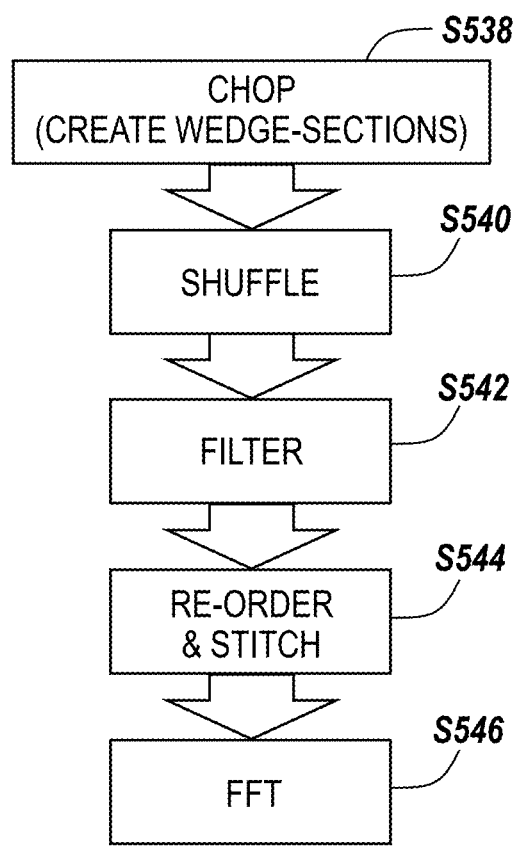
FIG. 8 includes a logical flow diagram illustrating the logical flow of radar signal processing with reduced interference, according to exemplary embodiments.

FIG. 8 includes a logical flow diagram illustrating the logical flow of radar signal processing with reduced interference, according to exemplary embodiments. Referring to FIG. 8, in steps S538 and S540, the transmit signal waveform is "chopped" and "shuffled," respectively. That is, the transmitted radar signals, divided into multiple sections or wedges, is generated and transmitted. In step S542, the returning radar signals are received, and the IF signal is low-pass filtered. Next, as described above in detail an illustrated in FIG. 7, the low-pass-filtered IF signal is digitized in an ADC. In step S544, the sections or wedges of the digitized and filtered IF signal are reordered and stitched together. In step S546, radar processing, which can include an FFT computation, is carried out to perform object detection and parameter determination.

Figure 9:
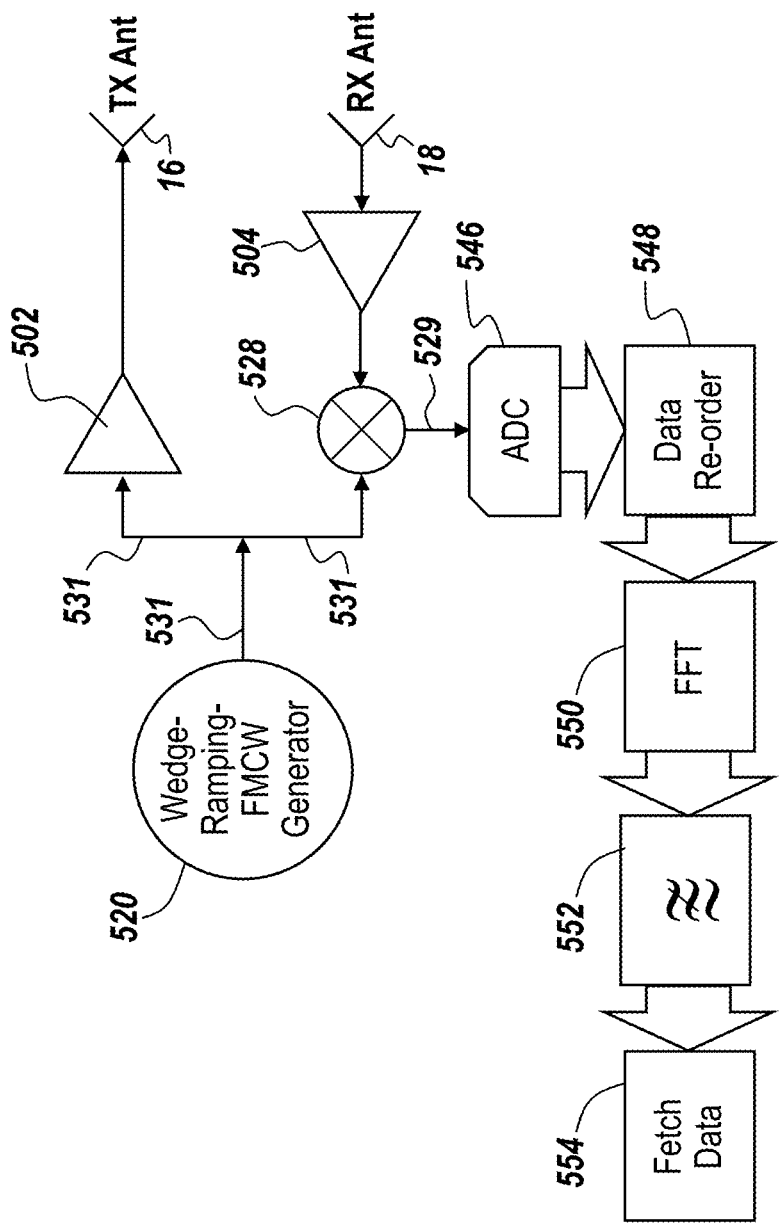
FIG. 9 includes a schematic functional block diagram which illustrates a radar sensor module for processing automotive radar signals, using digital low-pass filtering, in accordance with exemplary embodiments.
Figure 10:
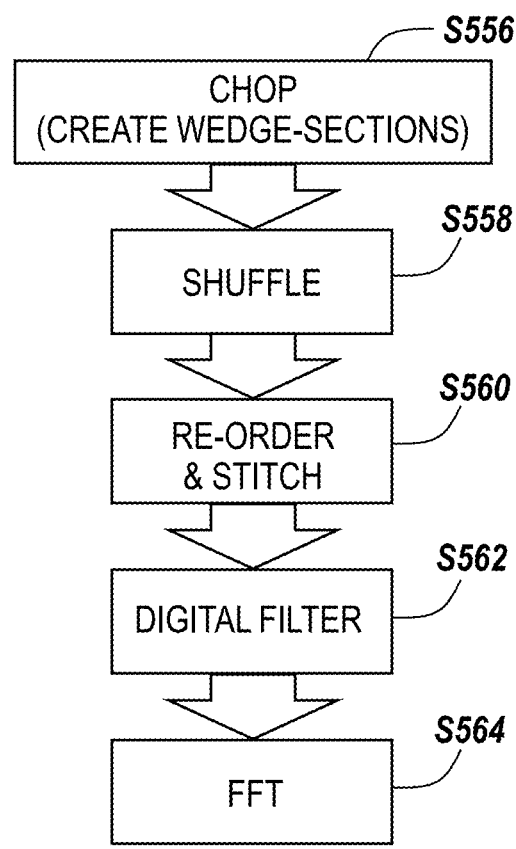
FIG. 10 includes a logical flow diagram illustrating the logical flow of radar signal processing with reduced interference, using digital low-pass filtering, according to exemplary embodiments.

According to alternative exemplary embodiments, digital low-pass filtering can be used instead of the analog low-pass filtering described above in detail. In these alternative embodiments, the ordering of the digitization and filtering are reversed. FIGS. 9 and 10 are variations of FIGS. 7 and 8, respectively, illustrating these alternative embodiments. Specifically, FIG. 9 includes a schematic functional block diagram which illustrates a radar sensor module for processing automotive radar signals, using digital low-pass filtering, in accordance with some exemplary embodiments. FIG. 10 includes a logical flow diagram illustrating the logical flow of radar signal processing with reduced interference, using digital low-pass filtering, according to exemplary embodiments.

Referring to FIG. 9, the elements that are the same as the embodiment of FIG. 7 are identified by like reference numerals. The IF signal out of mixer 528 on line 529 is digitized by ADC 546. The digitized data for the multiple wedges or sections are then reordered and stitched together as indicated at 548. Normal radar processing on the reordered and stitched data is then initiated, such as by DSP 36 illustrated in FIG. 1, which can include, for example, Fast Fourier Transform (FFT) processing 550. The FFT output data is then digitally low-pass filtered in digital low-pass filter 552. Radar processing continues as illustrated by a data fetch block 554 to perform object detection and parameter determination.

Referring to FIG. 10, in steps S556 and S558, the transmit signal waveform is "chopped" and "shuffled," respectively. That is, the transmitted radar signals, divided into multiple sections or wedges, is generated and transmitted. In step S560, the returning radar signals are received, digitized, reordered and stitched together. Next, in step 562, the digitized, reordered and stitched digital IF data is digitally low-pass filtered. In step S564, radar processing, which can include an FFT computation, is carried out to perform object detection and parameter determination.

According to the exemplary embodiments, any received signal, if not from the same wedge or section, will create an IF signal output at a frequency higher than the cutoff frequency of the low-pass filter. As a result, the higher-frequency components are filtered by the low-pass filter out of the IF signal being processed, thus eliminating or substantially reducing interference from other sensors. Also, since the ordering or shuffling of the frequencies of the wedges is random or pseudo-random, the chance of a wedge coinciding with the same frequency of other sensors is low.

In exemplary embodiments, the frequency of the signal generated by wedge-ramping FMCW generator 520 is controlled by a phase-locked loop (PLL) circuit. It is the PLL that controls the frequency stepping between wedges and the frequency ramping within each wedge. According to some exemplary embodiments, certain considerations are made regarding the step size between adjacent wedges. For example, the frequency step size is small enough to allow the PLL to lock phase quickly enough to set up in time for the next wedge. On the other hand, the frequency step between wedges is large enough such that the IF low-pass filter is able to filter out the interference signal. In some exemplary embodiments, a small inter-wedge buffer time can be implemented to mitigate any possible challenges with meeting these competing factors regarding frequency step size.

As described above, according to exemplary embodiments, the transmitted signal 150 is divided into multiple, e.g., eight, sections or wedges, and the sections or wedges are shuffled in time. The result is to create high-frequency components in the IF signal due to any possible interfering sensor which can be filtered out of the IF signal by a low-pass filter. According to alternative embodiments, other approaches to creating these high-frequency components can be used.

Figure 11:
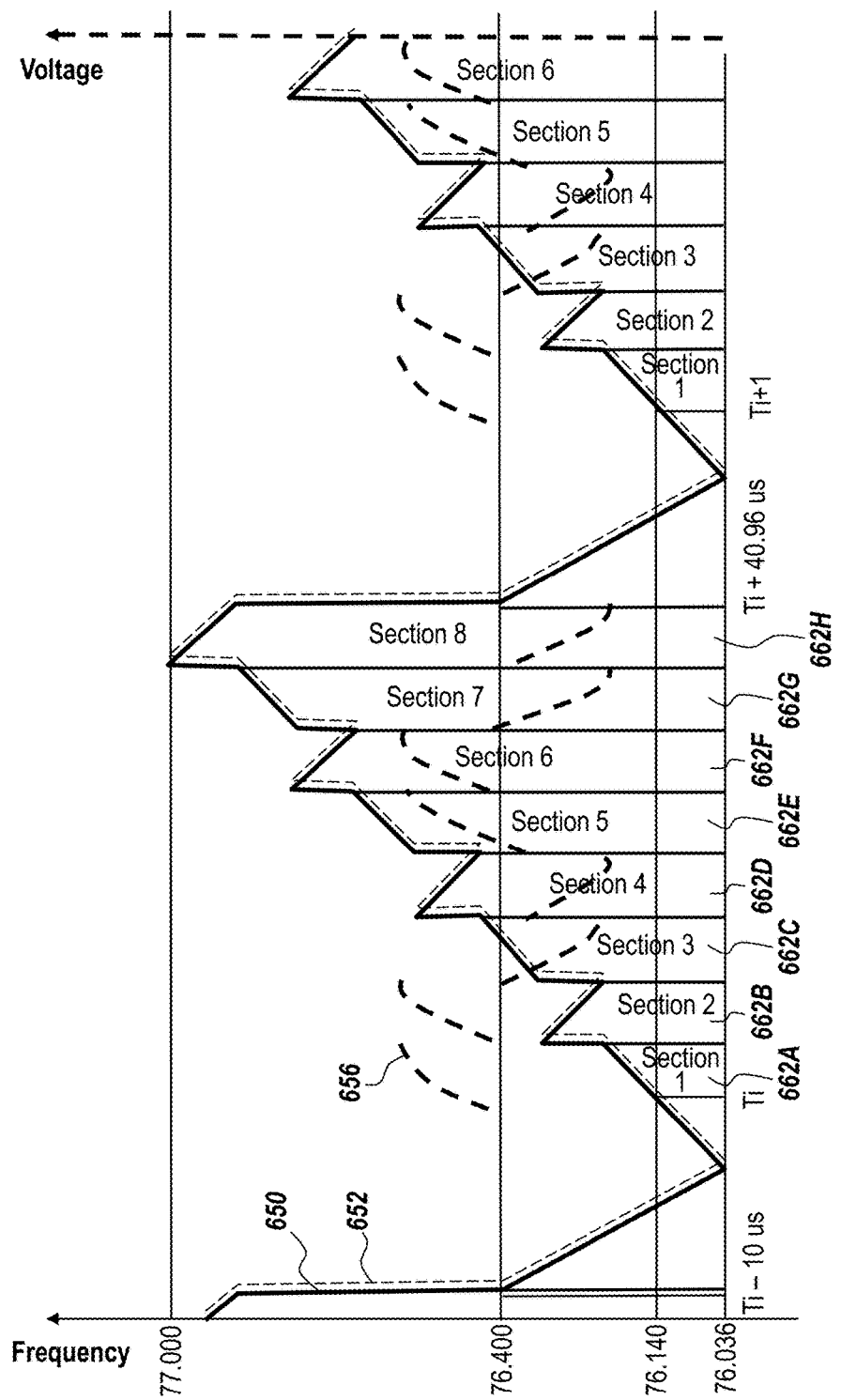
FIG. 11 includes a schematic timing diagram of signals associated with another approach to reducing interference in radar processing, according to exemplary embodiments.

FIG. 11 includes a schematic timing diagram of signals associated with another approach to reducing interference in radar processing, according to exemplary embodiments. FIG. 11 includes a schematic timing diagram illustrating an alternative approach to defining a radar transmit signal 650 as including multiple sections, according to exemplary embodiments. Referring to FIG. 11, each ramp is divided into a plurality of sections or wedges 662A through 662H, also referred to as Sections 1 through 8. According to the exemplary embodiments, each section or wedge 662 is defined to include an associated section of transmitted signal 650, an associated section of received return signal 652 and an associated section of IF signal 656. According to exemplary embodiments, as illustrated in FIG. 11, each ramping cycle is sectioned or chopped into a quantity N of wedges or sections 662. In the particular exemplary embodiment illustrated in FIG. 11, N=8. Hence, using the exemplary frequency range of FIG. 11, each section or wedge 662 defines an approximate frequency ramp range of 850 MHz÷8=106.25 MHz for an approximate time duration of 40.96 μsec÷8=5.12 μsec. With a particular exemplary sampling of 1024 points for a total sweep, each section or wedge 662 includes 1024÷8=64 sample points.

According to the exemplary embodiment of FIG. 11, alternating frequency ramps are controlled such that they are mirror images of their corresponding counterparts in the conventional straight frequency ramp, such as that illustrated in FIG. 3. That is, in the illustrated exemplary embodiment, the frequency ramp for each of sections 2, 4, 6 and 8, is flipped to be a mirror image of its conventional counterpart. This approach can generate significant enough frequency differences between the IF of interfering sensors and the present sensor such that high-frequency components can be filtered out of the resulting IF to eliminate interference. All of the foregoing description of other exemplary embodiments is equally applicable to the embodiment illustrated in the timing diagram of FIG. 11.

Figure 12:
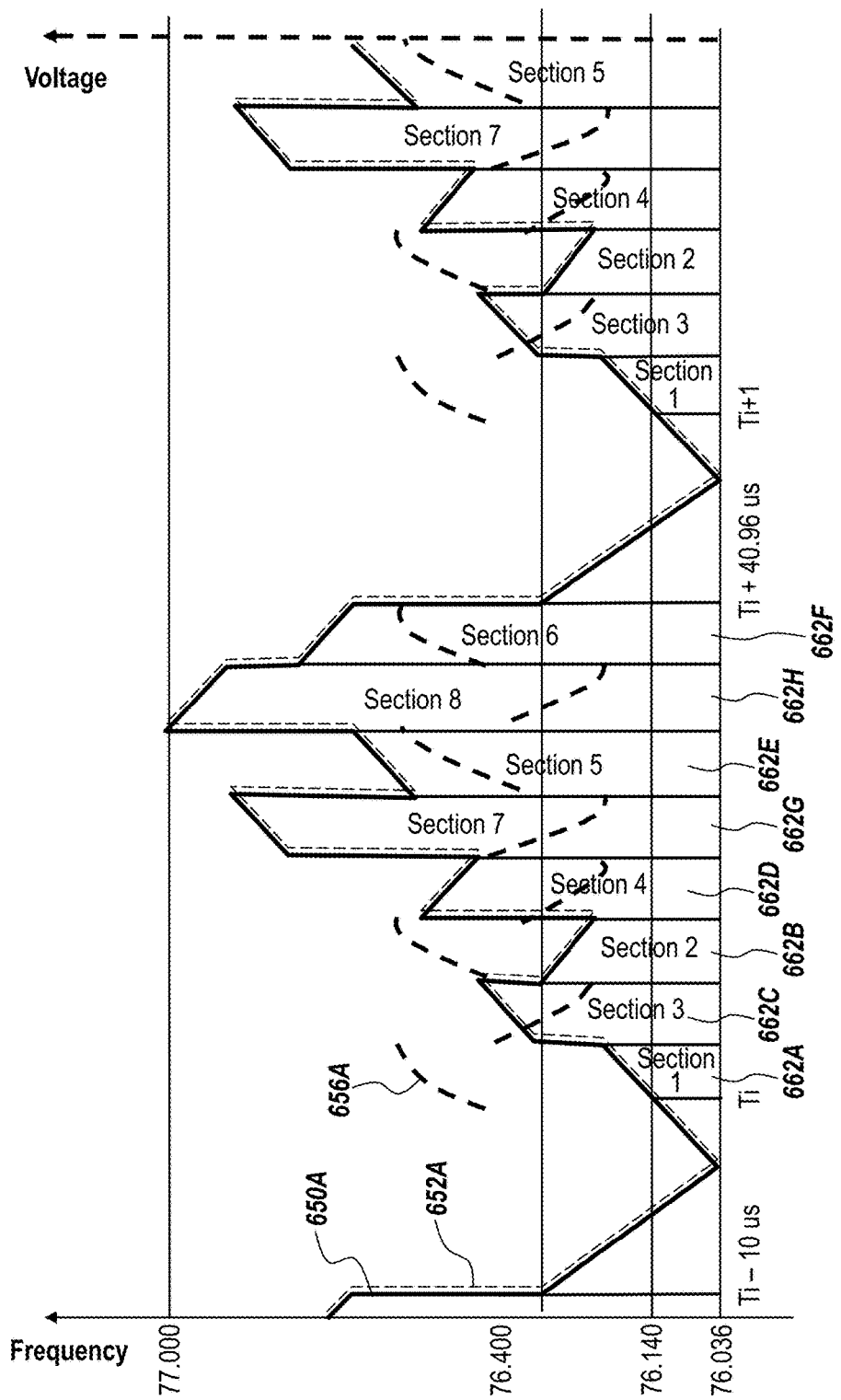
FIG. 12 includes a schematic timing diagram of signals associated with another approach to reducing interference in radar processing, according to exemplary embodiments.

FIG. 12 includes a schematic timing diagram of signals associated with another approach to reducing interference in radar processing, according to exemplary embodiments. FIG. 12 includes a schematic timing diagram illustrating another alternative approach to defining a radar transmit signal 650 as including multiple sections, according to exemplary embodiments. The approach of FIG. 12 is extension of the approach illustrated in FIG. 11, in that, in the embodiment of FIG. 12, in addition to the mirror imaging of alternating wedges of the embodiment of FIG. 11, the wedges are then shuffled or reordered in a random or pseudo-random fashion. This approach can also generate significant enough frequency differences between the IF of interfering sensors and the present sensor such that high-frequency components can be filtered out of the resulting IF to eliminate interference. All of the foregoing description of exemplary embodiments is equally applicable to the embodiment illustrated in the timing diagram of FIG. 12.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar processing method in a frequency-modulated continuous-wave (FMCW) radar system, comprising:
    defining a linear ramp signal having a frequency which varies linearly with time;
    defining a plurality of time sections of the linear ramp signal, each time section having a time duration, in a first order in time, the plurality of sections being ordered consecutively in time to define the linear ramp signal;

reordering the sections of the linear ramp signal in time such that the plurality of sections are in a second order in time different than the first order, in the second order, the plurality of sections defining a transmit control signal different than the linear ramp signal, the transmit control signal having a frequency which varies piecewise-linearly with time;

generating a radar transmission signal, a frequency of the radar transmission signal varying with time according to the transmit control signal;

transmitting the radar transmission signal into the region of interest;

receiving radar receive signals from the region of interest;

generating an intermediate frequency signal using the radar transmission signal and the radar receive signals, a frequency of the IF signal being a difference between the frequency of the radar transmission signal and a frequency of the radar receive signals;

low-pass filtering the IF signal to generate a low-pass-filtered IF signal;

performing radar processing on the low-pass-filtered IF signal to perform radar detection in the region of interest.

2. The method of claim 1, wherein the radar system is an automotive radar system.

3. The method of claim 1, further comprising digitizing the low-pass-filtered IF signal.

4. The method of claim 1, further comprising digitizing the IF signal before low-pass filtering the IF signal.

5. The method of claim 1, wherein low-pass filtering the IF signal comprises digital filtering.

6. The method of claim 1, wherein low-pass filtering the IF signal comprises analog filtering.

7. The method of claim 1, wherein the plurality of sections comprise eight sections.

8. The method of claim 1, further comprising, in at least one of the sections, reversing a direction in which the frequency of the radar transmission signal varies with time.

9. The method of claim 1, wherein the sections of the linear ramp signal are reordered in a pseudo-random fashion.

10. The method of claim 1, wherein the sections of the linear ramp signal are rearranged in a random fashion.

11. A frequency-modulated continuous wave (FMCW) radar system, comprising:
 a transmitter for transmitting a radar transmission signal into a region of interest;
 a receiver for receiving radar receive signals from the region of interest;
 signal processing circuitry for:
  (a) defining a linear ramp signal having a frequency which varies linearly with time,
  (b) defining a plurality of time sections of the linear ramp signal, each time section having a time duration, in a first order in time, the plurality of sections being ordered consecutively in time to define the linear ramp signal,
  (c) reordering the sections of the linear ramp signal in time such that the plurality of sections are in a second order in time different than the first order, in the second order, the plurality of sections defining a transmit control signal different than the linear ramp signal, the transmit control signal having a frequency which varies piecewise-linearly with time,
  (d) generating the radar transmission signal, a frequency of the radar transmission signal varying with time according to the transmit control signal, and
  (e) generating an intermediate frequency signal using the radar transmission signal and the radar receive signals, a frequency of the IF signal being a difference between the frequency of the radar transmission signal and a frequency of the radar receive signal; and
 a low-pass filter for low-pass filtering the IF signal to generate a low-pass-filtered IF signal; wherein
 the signal processing circuitry performs radar processing on the low-pass-filtered IF signal to perform radar detection in the region of interest.

12. The radar system of claim 11, wherein the radar system is an automotive radar system.

13. The radar system of claim 11, further comprising an analog-to-digital converter for digitizing the low-pass-filtered IF signal.

14. The radar system of claim 11, further comprising an analog-to-digital converter for digitizing the IF signal before it is low-pass-filtered.

15. The radar system of claim 11, wherein the low-pass filter is a digital low-pass filter.

16. The radar system of claim 11, wherein the low-pass filter is an analog low-pass filter.

17. The radar system of claim 11, wherein the plurality of sections comprise eight sections.

18. The radar system of claim 11, wherein the signal processing circuitry, in at least one of the sections, reverses a direction in which the frequency of the radar transmission signal varies with time.

19. The radar system of claim 11, wherein the sections of the linear ramp signal are reordered in a pseudo-random fashion.

20. The radar system of claim 11, wherein the sections of the linear ramp signal are rearranged in a random fashion.

* * * * *